(12) United States Patent
Kitaya

(10) Patent No.: US 10,419,659 B2
(45) Date of Patent: Sep. 17, 2019

(54) ELECTRONIC DEVICE AND CONTROL METHOD THEREOF TO SWITCH AN ITEM FOR WHICH A SETTING VALUE TO BE CHANGED

(71) Applicant: CANON KABUSHIKI KAISHA, Tokyo (JP)

(72) Inventor: Koki Kitaya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/913,625

(22) Filed: Mar. 6, 2018

(65) Prior Publication Data
US 2018/0270411 A1 Sep. 20, 2018

(30) Foreign Application Priority Data
Mar. 16, 2017 (JP) ................................ 2017-051820

(51) Int. Cl.
*H04N 5/232* (2006.01)
*G03B 17/02* (2006.01)
*G03B 7/00* (2014.01)

(52) U.S. Cl.
CPC .......... *H04N 5/23216* (2013.01); *G03B 7/00* (2013.01); *H04N 5/23245* (2013.01); *H04N 5/232939* (2018.08); *H04N 5/232941* (2018.08); *G03B 17/02* (2013.01)

(58) Field of Classification Search
CPC .... H04N 5/2252; H04N 5/2254; H04N 5/232; H04N 5/23216; H04N 5/23245; H04N 5/23293; H04N 5/232939; H04N 5/232941; G03B 13/03; G03B 17/00; G03B 17/02; G03B 7/00; G03B 13/02
See application file for complete search history.

(56) References Cited

U.S. PATENT DOCUMENTS

| | | | | |
|---|---|---|---|---|
| 8,314,853 | B2 * | 11/2012 | Nakase | G06F 17/30256 348/231.2 |
| 8,605,188 | B2 * | 12/2013 | Ishihara | G03B 3/10 348/333.01 |
| 9,167,142 | B2 * | 10/2015 | Yamashita | H04N 5/232 |
| 9,367,220 | B2 * | 6/2016 | Izaki | G06F 3/04845 |
| 9,509,913 | B2 * | 11/2016 | Kaneko | H04N 5/23216 |

(Continued)

FOREIGN PATENT DOCUMENTS

JP 2014042164 A 3/2014
JP 2016143343 A 8/2016

*Primary Examiner* — Ngoc Yen T Vu
(74) *Attorney, Agent, or Firm* — Canon U.S.A., Inc. IP Division

(57) ABSTRACT

An electronic device includes first and second operation units. Where an item, allocated as a setting item for which a setting value is changed according to an operation on the first operation unit, is a first item, the first item setting value is changed per the operation on the first operation unit. After a predetermined operation of releasing an operation on the second operation unit, or performing a particular operation to be performed after releasing the operation on the second operation unit, the allocated item becomes different depending on whether the operation on the second operation unit is continuously performed for a first period or longer after the operation is performed on the second operation unit when the first item is set as the allocated item, until the operation on the second operation unit is released.

19 Claims, 5 Drawing Sheets

(56) References Cited

U.S. PATENT DOCUMENTS

| | | | |
|---|---|---|---|
| 9,560,261 B2* | 1/2017 | Ishihara | G03B 3/10 |
| 9,692,971 B2* | 6/2017 | Sudo | H04N 5/23245 |
| 9,813,625 B2* | 11/2017 | Nakajima | G03B 17/02 |
| 2014/0085233 A1* | 3/2014 | Sudo | G06F 3/0488 |
| | | | 345/173 |
| 2016/0227105 A1* | 8/2016 | Kobayashi | H04N 5/23216 |
| 2017/0272583 A1* | 9/2017 | Kasa | G03B 15/00 |
| 2018/0227480 A1* | 8/2018 | Ogawa | H04N 5/23216 |
| 2019/0014248 A1* | 1/2019 | Takao | H04N 5/2252 |
| 2019/0079372 A1* | 3/2019 | Misawa | H04N 5/2252 |

\* cited by examiner

ELECTRONIC DEVICE AND CONTROL METHOD THEREOF TO SWITCH AN ITEM FOR WHICH A SETTING VALUE TO BE CHANGED

BACKGROUND OF THE INVENTION

Field of the Invention

The present disclosure relates to an electronic device and a control method thereof, and more particularly, to a technique for switching an item for which a setting value is to be changed.

Description of the Related Art

A method for switching an item for which a setting value is to be changed by performing an operation on a predetermined operation member, to thereby allow changing of the setting value for a plurality of items has been heretofore known. Japanese Patent Application Laid-Open No. 2014-042164 discusses a technique in which a display item representing a rotatable operation member for switching an item for which a setting value is to be changed is displayed by a touch operation, thereby allowing selection of a setting item different from the setting item selected before the touch operation is performed by a touch-move on the display item. Japanese Patent Application Laid-Open No. 2014-042164 also discusses a technique in which the setting value for the selected item can be changed while the setting items are touched when the setting items are selected. Japanese Patent Application Laid-Open No. 2016-143343 discusses a technique in which, when a setting item is selected on a setting screen, a sub screen for changing the setting value for the selected item is displayed. If an operation for returning the screen from the sub screen to the setting screen is performed, a setting item can be selected again.

In the method discussed in Japanese Patent Application Laid-Open No. 2014-042164, if a user releases the touch on the display item, the setting item is returned to the item selected before touching. Unless the user performs an operation for changing the item in the manner as described in the method discussed in Japanese Patent Application Laid-Open No. 2016-143343, the setting item is prohibited from being changed. In such a case, it is difficult for the user to quickly switch the item when the user wishes to temporarily change the setting item and immediately return the item to the original item.

SUMMARY OF THE INVENTION

The present disclosure is directed to improving the operability when a setting item for which a setting value is to be changed is switched by a predetermined operation.

According to an aspect of the present invention, an electronic device includes a first operation unit, a second operation unit, and a control unit configured to perform control, wherein, in a case where an item allocated as a setting item for which a setting value is changed according to an operation on the first operation unit is a first item, the control unit performs control to change the setting value for the first item according to the operation on the first operation unit, and wherein, after a predetermined operation of either one of releasing an operation on the second operation unit, and performing a particular operation on an operation unit which is different from the second operation unit to be performed after releasing the operation on the second operation unit, the control unit performs control in such a manner that an item, for which the setting value is changed according to the operation on the first operation unit, becomes different depending on whether the operation on the second operation unit is continuously performed for a first period or longer after the operation is performed on the second operation unit when the first item is set as the allocated item, until the operation on the second operation unit is released.

Further features of the present invention will become apparent from the following description of embodiments with reference to the attached drawings.

DESCRIPTION OF THE EMBODIMENTS

Embodiments will be described below with reference to the drawings.

Figure 1:
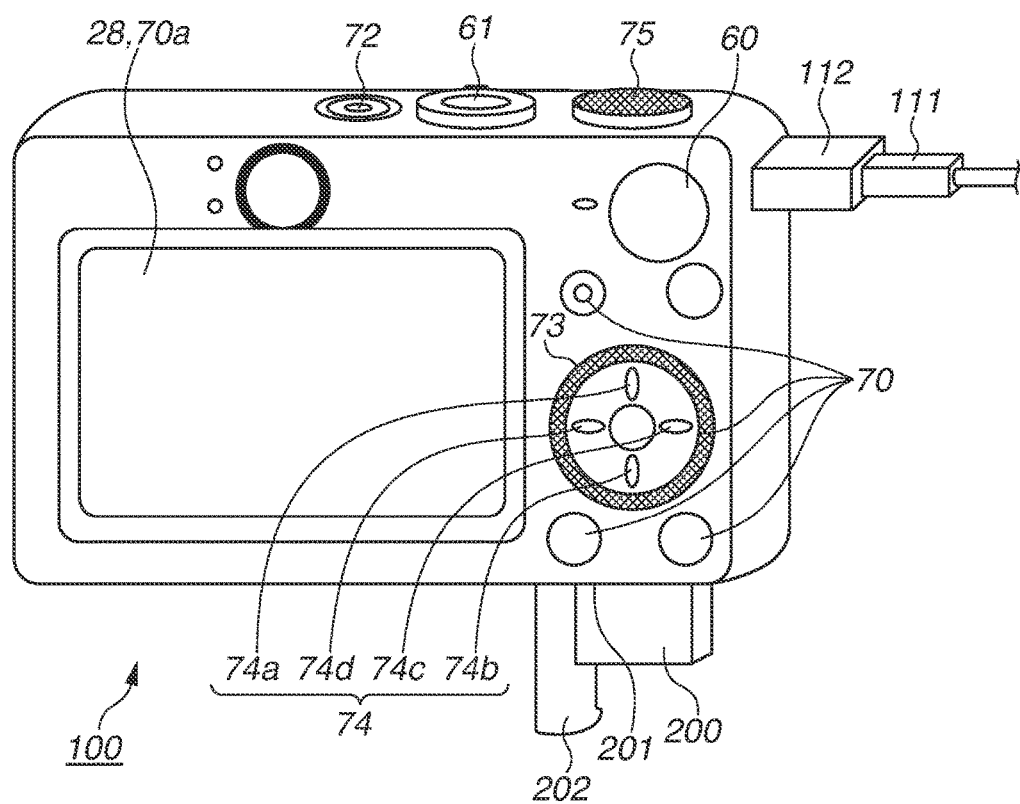
FIG. 1 is an appearance diagram illustrating a digital camera.
Figure 2:
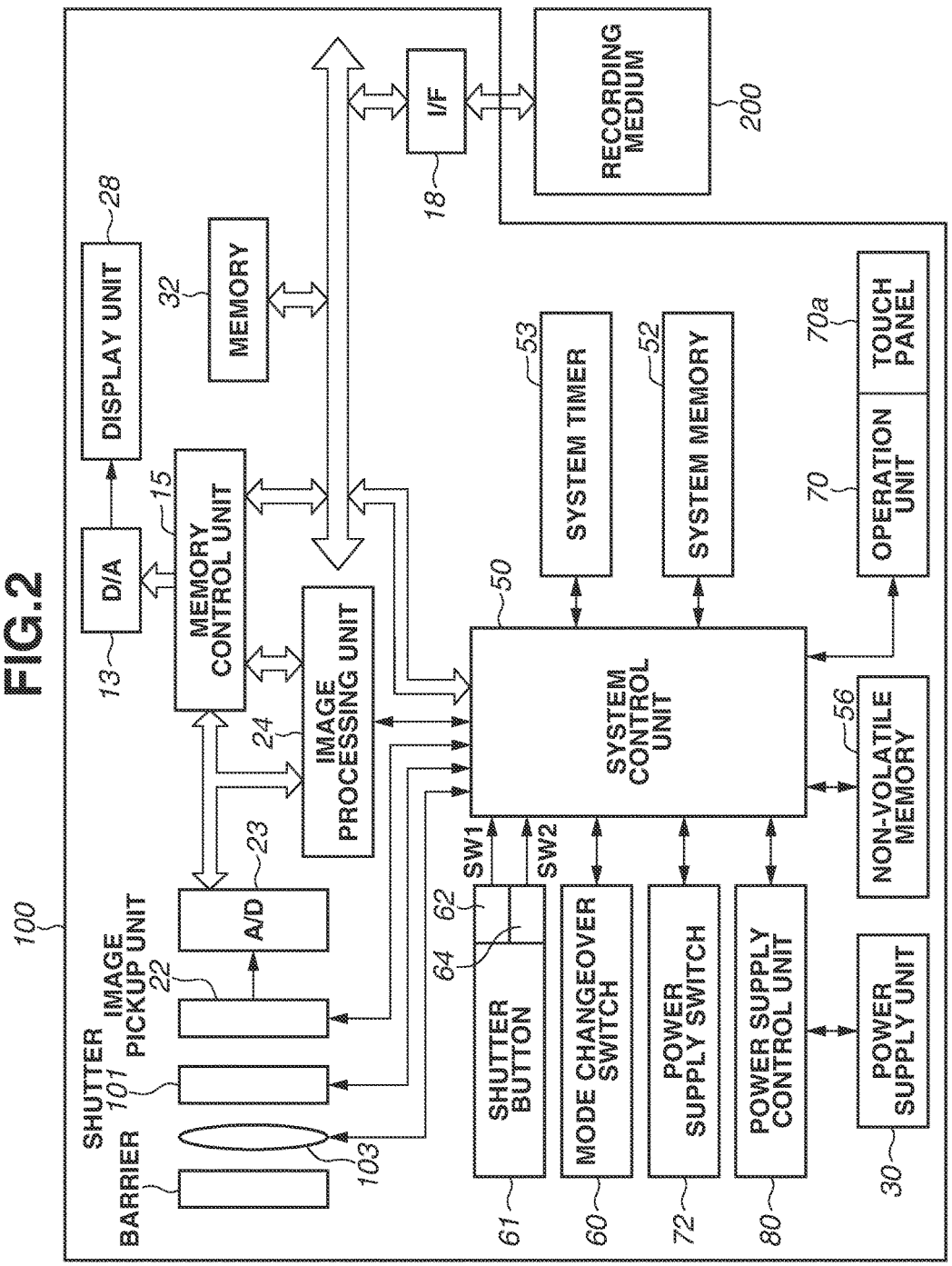
FIG. 2 is a block diagram illustrating a configuration example of the digital camera.

FIG. 1 is an appearance diagram illustrating a digital camera 100 as an example of an electronic device according to an embodiment. FIG. 2 is a block diagram illustrating a configuration example of the digital camera as an example of an image capturing control device according to the present embodiment.

FIG. 1 illustrates an appearance diagram of the digital camera 100. A display unit 28 is a display unit that displays images and various types of information. The display unit 28 is integrally formed with a touch panel 70a. A shutter button 61 is an operation unit for giving an image capture instruction (when the shutter button 61 is pressed, the image capture instruction is accepted in a first step, and image capturing is executed in a second step). A mode change-over switch 60 is an operation unit for switching various modes such as a manual (M) mode and an aperture priority (Av) mode. A connector 112 is used for connecting a connection cable 111, which is used to connect, for example, a personal computer (PC) or a printer, to the digital camera 100. Operation units 70 are units including operation members, such as various switches, buttons, and a touch panel, to accept various operations from a user. A controller wheel 73 is a rotatable operation member included in the operation units 70. An electronic dial 75 is a rotatable operation member and is cable of changing one of photo setting values, such as a shutter speed and an aperture value, in accordance with the rotation of the electronic dial 75. When the rotating operation of the electronic dial 75 is performed, an electric pulse signal is generated according to the amount of the rotating. A system control unit 50 controls each unit of the digital camera 100 based on the pulse signal. This pulse signal allows determination of, for example, the angle of rotation of the electronic dial 75, or the number of rotations of the electronic dial 75. Any operation member may be used as the electronic dial 75, as long as the operation member can detect the rotating operation. For example, a dial operation member in which a pulse signal is generated by the rotation of the electronic dial 75 itself according to the rotating operation by the user may be used. A touch operation member (a so-called touch wheel) which includes a touch sensor and is configured to detect a rotating operation or the like of a user's finger on the electronic dial 75, without rotation of the electronic dial 75 itself, may also be used. An arrow key 74 is provided within the controller wheel 73 and includes right, left, up, and down keys. In an image capturing mode described below, when each key is pressed, the function corresponding to the key is executed. For example, a right-arrow key 74c is a key for changing a setting for strobe. A left-arrow key 74d is a button for changing a focus state to one of a macro state, a manual focus state, and a normal state (so as to be in focus on the entire object). A down-arrow key 74b is a key for switching a display state of the display unit 28. An up-arrow key 74a is a key for switching a setting item to be changed by an operation on the electronic dial 75 among the setting items associated with exposure correction. The setting value that can be changed by the electronic dial 75 varies depending on the type of the image capturing mode. In a program (P) mode, when the up-arrow key 74a is pressed, the item indicating the setting value for exposure correction is displayed, thereby allowing setting of the exposure correction by the rotation of the electronic dial 75. In addition, when the up-arrow key 74a is pressed again, the item indicating the setting value for exposure correction is hidden, so that the setting value for exposure correction cannot be changed even when the rotating operation of the electronic dial 75 is performed. In a shutter speed priority (Tv) mode, when the up-arrow key 74a is pressed, the item that can be changed by operating the electronic dial 75 is switched to either the exposure correction or the shutter speed. In the aperture priority (Av) mode, when the up-cross key 74a is pressed, the item that can be changed by operating the electronic dial 75 is switched to either the exposure correction or the aperture value. In the manual (M) mode, when the up-cross key 74a is pressed, the item that can be changed by operating the electronic dial 75 is switched to either the shutter speed or the aperture value.

A power supply switch 72 is a push button for switching between power-on and power-off. A recording medium 200 is a non-volatile recording medium such as a memory card or a hard disk. A recording medium slot 201 is a slot for storing the recording medium 200. The recording medium 200 stored in the recording medium slot 201 allows communication with the digital camera 100 and also allows recording and reproduction of data. A lid 202 is a lid for the recording medium slot 201. FIG. 1 illustrates a state where the lid 202 is opened and a part of the recording medium 200 is ejected and exposed from the recording medium slot 201.

FIG. 2 is a block diagram illustrating a configuration example of the digital camera 100 according to the present embodiment.

Referring to FIG. 2, an image pickup lens 103 is a lens group including a zoom lens and a focus lens. A shutter 101 is a shutter including an aperture function. An image pickup unit 22 is an image sensor composed of a charge-coupled device (CCD) element, a complementary metal-oxide semiconductor (CMOS) element, or the like, to convert an optical image into an electrical signal. An A/D converter 23 is used to convert an analog signal output from the image pickup unit 22 into a digital signal.

An image processing unit 24 performs predetermined pixel interpolation processing, resize processing such as reduction, or color conversion processing on data from the A/D converter 23 or data from a memory control unit 15. The image processing unit 24 performs predetermined calculation processing using captured image data, and the system control unit 50 performs exposure control and range finding control based on the obtained calculation results. Thus, autofocus (AF) processing using a Though The Lens (TTL) system, automatic exposure (AE) processing, flash preliminary emission (EF) processing are carried out. Further, the image processing unit 24 performs predetermined calculation processing using captured image data, and also performs auto white balance (AWB) processing using the TTL system based on the obtained calculation results.

Output data from the A/D converter 23 is written into a memory 32 through the image processing unit 24 and the memory control unit 15, or is directly written into the memory 32 through the memory control unit 15 without passing through the image processing unit 24. The memory 32 stores image data, which is obtained by the image pickup unit 22 and converted into digital data by the A/D converter 23, and image data to be displayed on the display unit 28. The memory 32 has a storage capacity sufficient for storing a predetermined number of still images, and a moving image and sound of a predetermined period.

The memory 32 also functions as a memory for image display (video memory). A D/A converter 13 converts the data for image display stored in the memory 32 into an analog signal and supplies the analog signal to the display unit 28. Thus, the image data for display written in the memory 32 is displayed on the display unit 28 through the D/A converter 13. The display unit 28 offers display according to the analog signal supplied from the D/A converter 13 on a display device such as a liquid crystal display (LCD). The digital signal that is obtained by performing A/D conversion once by the A/D converter 23 and is stored in the memory 32 is converted into an analog signal by the D/A converter 13. The analog signal is sequentially transferred and displayed on the display unit 28. Thus, the display unit 28 functions as an electronic viewfinder, which allows through image display (live view display).

A non-volatile memory 56 is a memory serving as a recording medium that is electrically erasable, recordable, and readable by the system control unit 50. For example, an electrically erasable programmable read-only memory (EEPROM) may be adopted. The non-volatile memory 56 stores constants, programs, and the like used for operations to be performed by the system control unit 50. The programs described herein refer to computer programs for executing various flowcharts described below in the present embodiment.

The system control unit 50 incorporates at least one processor and controls the overall operation of the digital camera 100. Each processing according to the present embodiment described below is implemented by executing the programs recorded in the non-volatile memory 56 described above. A random-access memory (RAM) is used as a system memory 52. Constants and variables used for operations to be performed by the system control unit 50, and programs and the like read out from the non-volatile memory 56 are loaded into the system memory 52. Further, the system control unit 50 performs display control by controlling the memory 32, the D/A converter 13, the display unit 28, and the like.

A system timer 53 is a clocking unit that measures a time used for various control operations, and measures a time of a built-in clock.

Each of the mode change-over switch 60, the shutter button 61, and the operation units 70 is an operation unit for inputting various operation instructions to the system control unit 50.

The mode change-over switch 60 is a switch for changing the operation mode of the system control unit 50 to either one of a still image recording mode (P mode or M mode), a moving image capturing mode, or the like. Examples of the still image recording mode include an auto image capturing mode, an auto scene determination mode, a manual mode, various types of scene modes for making image capture settings on an image capture scene basis, a program mode, and a custom mode. The mode change-over switch 60 can directly switch the operation mode to one of the modes included in a menu screen. Alternatively, the screen may be temporarily switched to the menu screen by the mode change-over switch 60 and then switched to any one of the modes included in the menu screen using another operation member. Similarly, the moving image capturing mode may include a plurality of modes.

A first shutter switch 62 is turned on by pressing the shutter button 61 provided on the digital camera 100 halfway, that is, by so-called half-pressing (image capture preparation instruction), and generates a first shutter switch signal SW1. The first shutter switch signal SW1 starts an operation such as autofocus (AF) processing, automatic exposure (AE) processing, auto white balance (AWB) processing, or flash preliminary emission (EF) processing.

A second shutter switch 64 is turned on by pressing the shutter button 61 all the way down, that is, by full-pressing (image capture instruction), and generates a second shutter switch signal SW2. According to the second shutter switch signal SW2, the system control unit 50 starts a series of image capture processing operations starting from a still image capturing operation by the image pickup unit 22 and reading out of signals from the image pickup unit 22, to writing of image data into the recording medium 200.

By selecting and operating various function icons displayed on the display unit 28, functions for each scene are appropriately allocated to the operation members of the operation units 70, and thus the operation members of the operation units 70 function as various function buttons. Examples of the function buttons include an end button, a return button, an image feed button, a jump button, a narrow-down button, and an attribute change button. For example, when a menu button is pressed, the menu screen capable of making various types of settings is displayed on the display unit 28. The user can intuitively make various types of settings using the menu screen displayed on the display unit 28, the cross key 74, and a SET button.

The power supply control unit 80 is composed of, for example, a battery detection circuit, a DC-DC converter, and a switch circuit for changing a block to be energized, and detects whether a battery is mounted, the type of the battery, and a remaining battery level. The power supply control unit 80 controls the DC-DC converter based on the detection result and an instruction from the system control unit 50, and supplies a necessary voltage to the units including the recording medium 200 for a necessary period.

A power supply unit 30 includes a primary battery, such as an alkaline battery or a lithium battery, a secondary battery such as a NiCd battery, a NiMH battery, or a Li battery, and an AC adaptor. The power supply switch 72 is a switch for turning ON or OFF the power supply of the digital camera 100.

A recording medium I/F 18 is an interface with the recording medium 200 such as a memory card or a hard disk. The recording medium 200 is a non-volatile recording medium, such as a memory card, for recording images during image capturing, and includes a semiconductor memory, an optical disk, a magnetic disk, or the like.

As one of the operation units 70, the touch panel 70a capable of detecting a touch on the display unit 28 is provided. The touch panel 70a and the display unit 28 can be integrally formed. For example, the touch panel 70a is configured so as not to impede the display of the display unit 28 due to its light transmittance, and is attached to an upper layer on a display surface of the display unit 82. Input coordinates on the touch panel 70a are configured to correspond to display coordinates on the display unit 28. Thus, a graphical user interface (GUI) is realized which allows the user to feel as if the user can directly operate the screen displayed on the display unit 28. The system control unit 50 can detect the following operations or states on the touch panel 70a:

A finger or pen that has not touched the touch panel newly touches the touch panel. That is, start of a touch (hereinafter referred to as touch-down).

A finger or pen is touching the touch panel (hereinafter referred to as touch-on).

A finger or pen is moving on the touch panel while the finger or pen is touching the touch panel. That is, a movement of a touch position (hereinafter referred to as touch-move).

A finger or pen that has been touching the touch panel is separated from the touch panel. That is, end of a touch (hereinafter referred to as touch-up).

Nothing is touching the touch panel (hereinafter referred to as touch-off).

When touch-down is detected, touch-on is detected at the same time. After touch-down, touch-on is generally detected continuously, unless touch-up is detected. When touch-move is detected, touch-on is detected. Even when touch-on is detected, touch-move is not detected, unless the touch position is moved. After touch-up of all fingers or the pen which has been touching the touch panel is detected, touch-off is detected.

The system control unit 50 is notified of such operations and states and the position coordinates of the finger or pen touching the touch panel via an internal bus. The system control unit 50 determines what kind of operation has been carried out on the touch panel based on the notified information. As for touch-move, a movement direction of the finger or pen moving on the touch panel can also be determined for each of a vertical component and a horizontal component on the touch panel based on a change in the position coordinates. It is determined that a stroke has been depicted when touch-up is performed after there is a certain touch-move from touch-down on the touch panel. An operation for quickly depicting the stroke is referred to as flick. The term "flick" is used to describe an operation in which a finger is quickly moved by a certain distance while the finer is touching the touch panel, and then the finger is detached from the touch panel. In other words, flick is an operation of quick flicking on the touch panel with a finger. When touch-move by a predetermined distance or more at a predetermined speed or higher is detected and touch-up is detected in this state, it can be determined that flick has been carried out. When touch-move by the predetermined distance or more at a speed less than the predetermined speed is detected, it is determined that drag has been carried out. As the touch panel, various touch panels of any types, such as a resistive touch panel, a capacitive touch panel, a surface acoustic wave touch panel, an infrared touch panel, an electromagnetic induction touch panel, an image recognition touch panel, and an optical sensor touch panel, may be used. There are various detection methods, such as a method of detecting a touch when the touch panel is touched, or a method of detecting a touch when a finger or pen approaches the touch panel but is not touching the touch panel. Any one of these methods may be employed.

Processing in the image capturing mode according to the present embodiment will be described with reference to FIG. 3. This processing is implemented in such a manner that a program recorded on the non-volatile memory 56 is loaded into the system memory 52 and is executed by the system control unit 50. This processing is started when the digital camera 100 is powered on to start the image capturing mode and a live view image is displayed on the display unit 28 (an image capture standby screen is displayed).

In step S301, the system control unit 50 acquires the current image capturing mode, and acquires an allocated item that corresponds to the image capturing mode stored in the non-volatile memory 56 and is changed by rotating the electronic dial 75. If there is a plurality of allocated items, information about any one of the allocated items which is set as an initial item is acquired. If only the exposure correction item can be changed by the operation on the electronic dial 75, like in the P mode, the initial item is not set. In the program (P) mode, the initial item is the exposure correction. In the shutter speed priority (Tv) mode, the initial item is the shutter speed. In the aperture priority (Av) mode, the initial item is the aperture value. In the manual (M) mode, the initial item is the shutter speed.

Figure 5A:
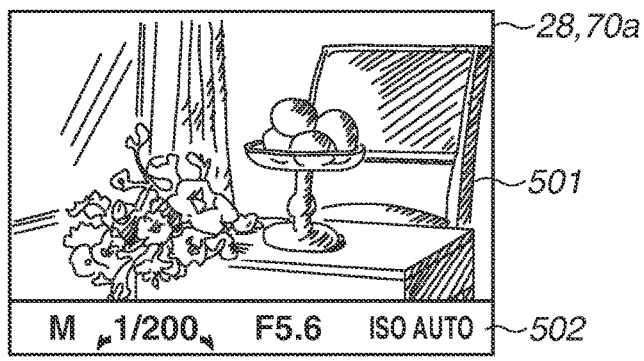
FIGS. 5A to 5G each illustrate a display.
Figure 5B:
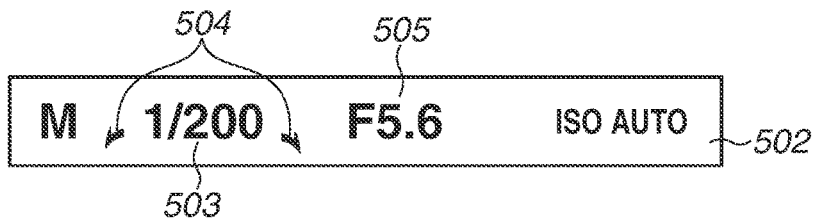

In step S302, the system control unit 50 sets the initial item acquired in step S301 as the setting item (allocated item) for changing the setting value according to the rotating operation of the electronic dial 75, and records the setting item on the system memory 52. FIGS. 5A and 5B illustrate display examples on the display unit 28 according to the present embodiment. An area 502 for displaying the setting item is located below a live view screen 501 illustrated in FIG. 5A. FIG. 5B illustrates a display example in the area 502 when the manual mode is set as the image capturing mode. As illustrated in FIG. 5B, in step S302, when the shutter speed, which is the initial item of the manual mode, is set as the allocated item, marks 504 are displayed in such a manner that the marks 504 sandwich the shutter speed in the area 502 and an item 503 indicating the setting value for the shutter speed. The marks 504 indicate that the setting value can be changed by an operation on the electronic dial 75. The marks 504 represent an item indicating the electronic dial 75. The marks 504 are displayed in such a manner that the marks 504 sandwich either the item 503 or an item 505 indicating the aperture value and the setting value for the aperture. The display of the area 502 allows the user to recognize a setting item that can be changed by the current operation on the electronic dial 75. Further, by an operation for switching the allocated item as described below, the user can recognize that other setting items can also be changed by operating the electronic dial 75. For convenience of description, the initial item is herein referred to as an item A.

In step S303, the system control unit 50 determines whether the image capturing mode is switched. The image capturing mode is switched when the mode change-over switch 60 is operated. If it is determined that the image capturing mode is switched (YES in step S303), the processing returns to step S301. If it is determined that the image capturing mode is not switched (NO in step S303), the processing proceeds to step S304.

In step S304, the system control unit 50 determines whether the electronic dial 75 is operated. If it is determined that the electronic dial 75 is operated (YES in step S304), the processing proceeds to step S305. If it is determined that the electronic dial 75 is not operated (NO in step S304), the processing proceeds to step S306.

In step S305, the system control unit 50 changes the setting value for the setting item currently set as the allocated item. If the shutter speed is ½00, the setting value increases to, for example, ⅙0 or ¹⁄₁₂₅ as the electronic dial 75 is turned to the left, and the setting value decreases to, for example, ¹⁄₂₅₀ or ¹⁄₃₂₀ as the electronic dial 75 is turned to the right.

In step S306, the system control unit 50 determines whether the up-cross key 74a is pressed, that is, whether the allocated item is switched. If it is determined that the up-cross key 74a is pressed (YES in step S306), the processing proceeds to step S307. If it is determined that the up-cross key 74a is not pressed (NO in step S306), the processing proceeds to step S316.

In step S307, the system control unit 50 determines whether the currently allocated item is the item A. If it is determined that the currently allocated item is the item A (YES in step S307), the processing proceeds to step S308. If it is determined that the currently set allocated item is not the item A (NO in step S307), the processing proceeds to step S309.

In step S308, the system control unit 50 switches the allocated item from the item A to an item B which is different from the item A. In other words, the allocated item is switched.

Figure 5C:

In step S309, the system control unit 50 switches the allocated item from the item B to the item A which is different from the item B. In this manner, in steps S308 and S309, the allocated item is switched, and the allocated function obtained after switching is recorded on the system memory 52. FIG. 5C illustrates a display example of the area 502 when the allocated item is switched from the shutter speed illustrated in FIG. 5B. As illustrated in FIG. 5C, when the allocated item is switched in the processing of steps S307 to S309, the allocated item is switched from the shutter speed to the aperture value, and the marks 504 are displayed in such a manner that the marks 504 sandwich the item 505 indicating the aperture value. Thus, the user can recognize that the setting value for the aperture can be changed by operating the electronic dial 75.

In step S310, the system control unit 50 performs switching determination processing. The switching determination processing is processing for determining whether to return the allocated item to the original setting item when pressing of the up-cross key 74a is released after the allocated item is switched over by pressing the up-cross key 74a. Specific processing of the switching determination processing will be described with reference to FIG. 4A (and FIG. 4B as a modified example).

In step S311, the system control unit 50 determines whether the pressing of the up-cross key 74a is released. If it is determined that the pressing of the up-cross key 74a is released (YES in step S311), the processing proceeds to step S312. If it is determined that the pressing of the up-cross key 74a is not released (NO in step S311), the processing returns to step S310.

In step S312, the system control unit 50 determines whether the switching flag is ON. In the switching determination processing described with reference to step S310 and FIG. 4A or 4B, it is determined whether the switching flag is ON. If it is determined that the switching flag is ON (YES in step S312), the processing proceeds to step S313. If it is determined that the switching flag is not ON (NO in step S312), the processing returns to step S304. If it is determined that the switching flag is ON, the switching flag is turned off in S312.

Figure 5D:
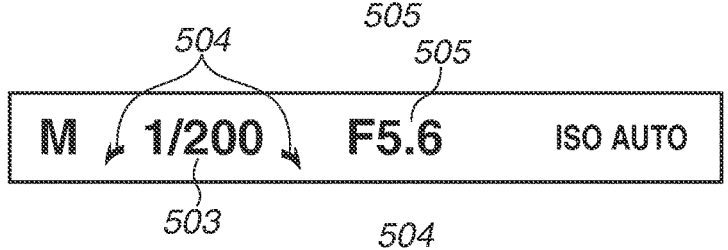
Figure 5E:
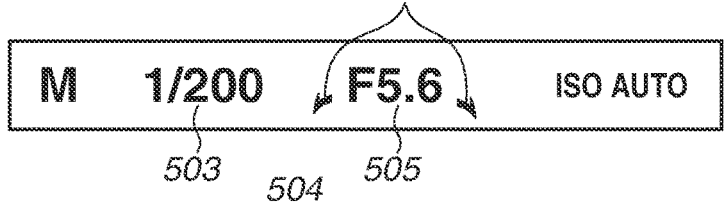

Processing of steps S313 to S315 is similar to the processing of steps S307 to S309, and the allocated item is switched in the processing. Specifically, if it is determined that the switching flag is ON in step S312, the allocated item is returned from the setting item, which has been switched in the preceding processing of steps S307 to S309, to the original setting item when pressing of the up-cross key 74a is released. FIG. 5D illustrates a display example of the area 502 in a case where the pressing of the up-cross key 74a is released when the switching flag is ON. As illustrated in FIG. 5D, when the switching flag is ON, the allocated item returns to the original setting item when the pressing of the up-cross key 74a is released. Accordingly, the state where the marks 504 are added to the item 505 as illustrated in FIG. 5C shifts to the state where the marks 504 are added to the item 503 as illustrated in FIG. 5D, like in FIG. 5A. On the other hand, if the determination result indicates NO in step S312, the allocated item is not changed. Accordingly, even when the pressing of the up-cross key 74a is released, the display of the area 502 is not changed as illustrated in FIG. 5E.

In step S316, the system control unit 50 determines whether the image capture instruction is given. The image capture instruction can be given by pressing the shutter button 61. At this time, photometry processing is performed according to a half-pressed state of the shutter button 61, and a setting for exposure is made based on the setting values set in the respective setting items.

In step S317, the system control unit 50 performs image capture processing. The image capture processing is processing for recording images captured by the image pickup unit 22 on the recording medium 200.

In step S318, the system control unit 50 determines whether the image capturing mode processing is to be finished. The image capturing mode processing is finished by switching to the menu screen, switching to the reproduction mode, or turning off the power supply. If it is determined that an operation for ending the image capturing mode has been performed (YES in step S318), the image capturing mode processing is terminated. If it is determined that the operation for ending the image capturing mode has not been performed (NO in step S318), the processing returns to step S303.

Next, the switching determination processing will be described with reference to FIG. 4A. This processing is implemented in such a manner that a program recorded on the non-volatile memory 56 is loaded into the system memory 52 and is executed by the system control unit 50. The switching determination processing is started when the processing proceeds to step S310 illustrated in FIG. 3.

Figure 3:
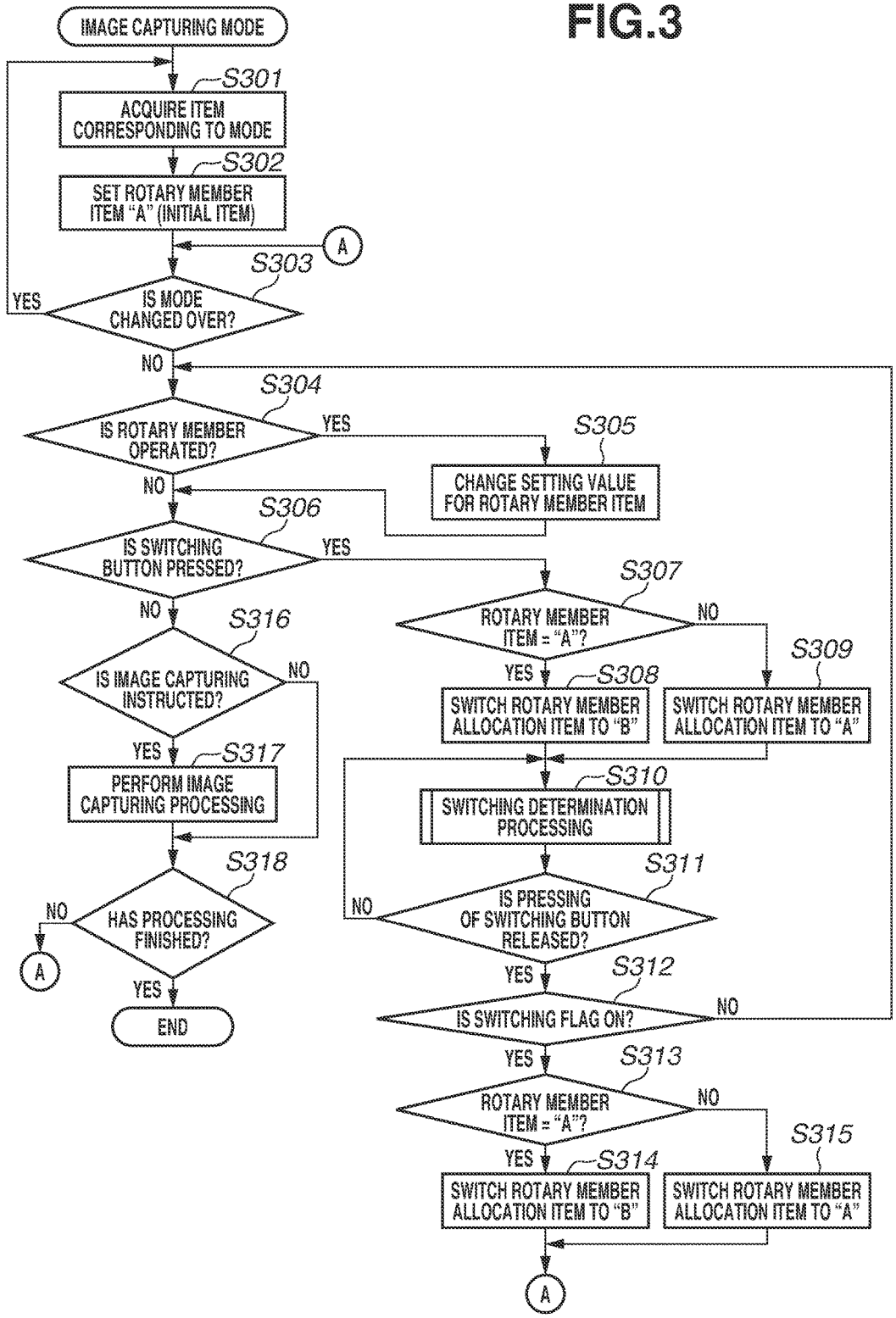
FIG. 3 is a flowchart illustrating processing for an image capturing mode.
Figure 4A:
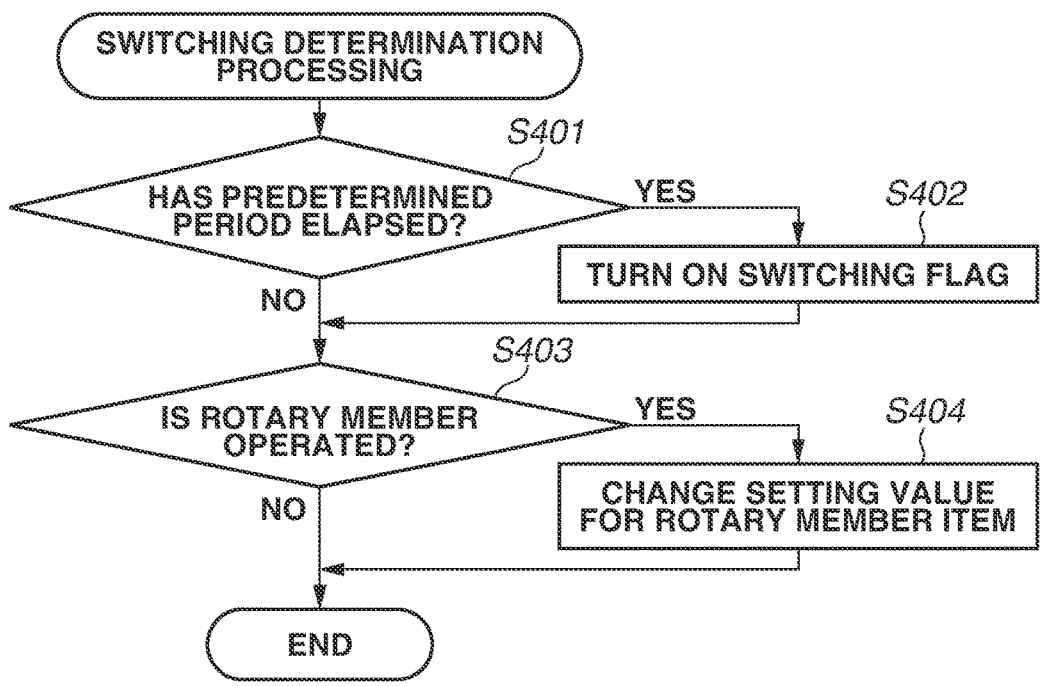
FIG. 4A is a flowchart illustrating switching determination processing.

In step S401, the system control unit 50 determines whether a certain period has elapsed after pressing of the up-cross key 74a is started in step S306 illustrated in FIG. 3. Specifically, the system control unit 50 determines whether a certain period has elapsed in a state where the up-cross key 74a is pressed. A certain period is a period of three seconds, five seconds, and so on. If it is determined that a certain period has elapsed after the pressing of the up-cross key 74a is started (YES in step S401), the processing proceeds to step S402. If it is determined that a certain period has not elapsed after the pressing of the up-cross key 74a is started (NO in step S401), the processing proceeds to step S403.

In step S402, the system control unit 50 turns on the switching flag and records the switching flag on the system memory 52. When the up-cross key 74a is pressed for a certain period or longer (continuously pressed for a predetermined period or longer), the switching flag is turned on to thereby allow switching of the allocated item from the setting item selected before the pressing, only during the period in which the up-cross key 74a is pressed. When the pressing of the up-cross key 74a is released, the allocated item can be returned to the original setting item, so that the user can quickly change the setting value for the original setting item. For example, when the user wishes to temporarily switch the setting item for which the setting value is changed from the shutter speed to the aperture value, the number of operations is increased by an amount corresponding to operations of pressing the up-cross key 74a to return the setting item to the shutter speed if the setting item is not changed from the aperture value even after the pressing of the up-cross key 74a is released. In particular, when the user wishes to quickly change the setting value for image capturing immediately before image capturing, more time and labor is required and a time for changing the setting value to a desired value is required, which may deteriorate the operability and it is possible that an opportunity for image capture is missed. However, if the switching flag is turned on, the allocated item is switched from the aperture value to the shutter speed when the pressing of the up-cross key 74a is released, so that a desired setting value can be promptly and easily set.

On the other hand, if the determination result indicates NO in step S401, the processing proceeds to step S403 and subsequent steps, and then the determination processing in step S402 is repeated until the pressing of the up-cross key 74a is released in step S311 illustrated in FIG. 3. If a time until the release of the pressing of the up-cross key 74a is less than a certain period, the switching flag is turned off. If the user has released the pressing of the up-cross key 74a immediately after pressing the up-cross key 74a, there is only a little time for operating the electronic dial 75 during the pressing of the up-cross key 74a. Therefore, in this case, if the allocated item is returned to the original setting value according to the release of the pressing of the up-cross key 74a, it is highly likely that the user cannot sufficiently perform the operation for changing the setting value for the setting item after switching. For example, in a case where the pressing of the up-cross key 74a is released in one second when the allocated item set before the pressing the up-cross key 74a is the shutter speed, if the allocated item is returned to the shutter speed according to the release of the pressing of the up-cross key 74a, the user has only one second to perform the operation for changing the setting value for the aperture value. Specifically, once the user has switched the allocated item, it is highly likely that the user does not intend to switch the allocated item until the user presses the up-cross key 74a next time. Accordingly, the allocated item is prevented from being returned to the original setting value according to the release of the pressing of the up-cross key 74a.

Processing of steps S403 and S404 is similar to the processing of steps S304 and S305 illustrated in FIG. 3.

Thus, according to the embodiment described above, the setting item for which the setting value is changed can be switched according to a user's intent. The user can select whether to temporarily switch the allocated item depending on a key pressing period for switching the allocated item. In other words, the user can select whether to return the setting item for which the setting value is changed to the original setting value according to the release of pressing of the key.

Modified Example

Figure 4B:
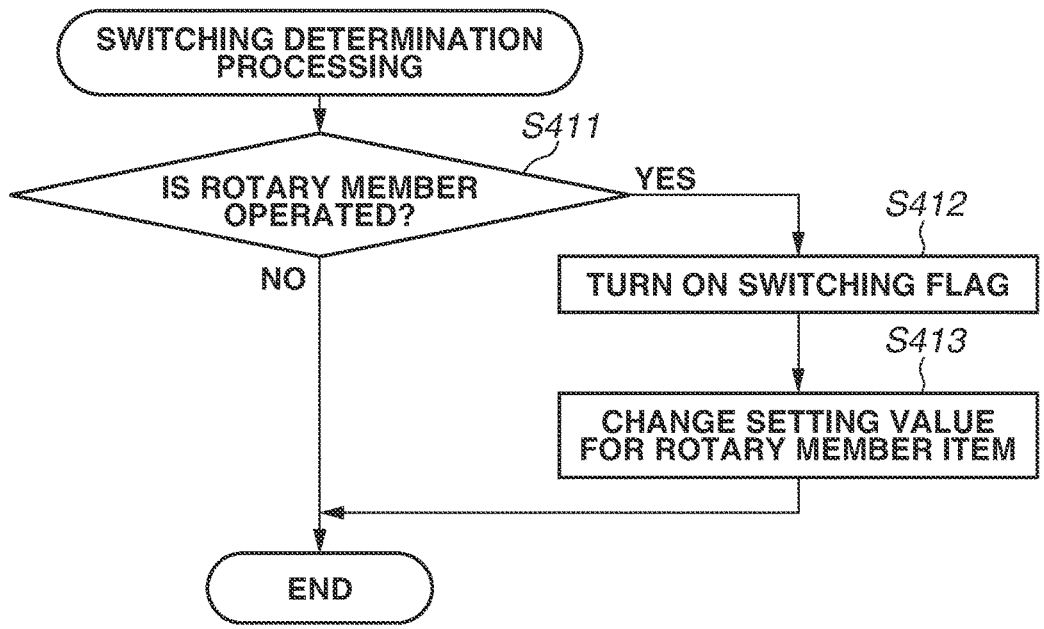
FIG. 4B is a flowchart illustrating switching determination processing.

Next, a modified example of the switching determination processing of step S310 illustrated in FIG. 3 will be described with reference to FIG. 4B. This processing is implemented in such a manner that the system control unit 50 loads a program recorded on the non-volatile memory 56 into the system memory 52 and executes the program. The processing illustrated in FIG. 4B is processing to be performed in a state where the up-cross key 74a is pressed. Conditions for the processing illustrated in FIG. 4B are different from conditions for the processing illustrated in FIG. 4A in that the switching flag is ON.

In step S411, the system control unit 50 determines whether the electronic dial 75 is operated, like in step S304. If it is determined that the electronic dial 75 is operated (YES in step S411), the processing proceeds to step S412. If it is determined that the electronic dial 75 is not operated (NO in step S411), this processing is terminated and the processing proceeds to step S311 illustrated in FIG. 3.

In step S412, the system control unit 50 turns on the switching flag and records the switching flag on the system memory 52. Specifically, in the modified example, if the operation for changing the setting value for the allocated item is performed during the pressing of the up-cross key 74a, the switching flag is turned on. When the user attempts to temporarily switch the allocated item to change the setting value, if the operation for changing the setting value is performed while pressing the up-cross key 74a, the allocated item can return to the original setting item only by releasing the pressing of the up-cross key 74a.

In step S413, the system control unit 50 changes the setting value for the setting item set as the current allocated item, like in step S305 illustrated in FIG. 3.

According to the modified example described above, the setting item for which the setting value is changed can be switched by a predetermined operation according to a user's intent. The user can select whether to temporarily switch the allocated item depending on whether the operation for changing the setting value for the setting item is carried out during the pressing of a key for switching the setting item for which the setting value is changed. In other words, it is possible to select whether to return the allocated item to the original setting item according to the release of pressing of the key, depending on whether the operation for changing the setting value is carried out during pressing of the key.

In the embodiments and the modified example described above, it is determined whether to turn on the switching flag depending on the period for pressing the up-cross key 74a, or depending on whether the operation for changing the setting value is carried out during the pressing of the up-cross key 74a. However, the following configuration can be employed: the switching flag may be turned on when the period for pressing the up-cross key 74a is a certain time or longer and the operation for changing the setting value for the allocated item during the pressing of the up-cross key 74a is carried out.

The number of setting items that can be switched in each mode as the allocated item may be one, two, or more.

In addition, even if the allocated item is not changed based on the switching flag according to the release of the pressing of the up-cross key 74a, the allocated item may be changed according to the switching flag when a certain period, such as two seconds or three seconds, has lapsed after the setting value is changed. More specifically, the allocated item may be returned to the original setting item when two seconds have elapsed after the operation for changing the setting value for the initial allocated item is finished after the up-cross key 74a has been pressed for a certain period or longer. Further, when the switching flag is ON, the allocated item may be returned to the original setting item in response to the image capture instruction in step S316 illustrated in FIG. 3.

Figure 5F:
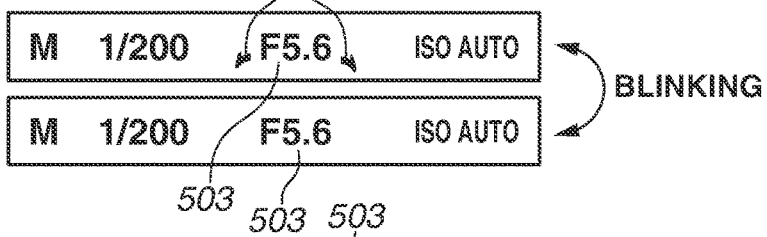
Figure 5G:

Furthermore, when the switching flag is turned on, as illustrated in FIGS. 5F and 5G, the marks 504 displayed in the area 502 may be blinked (illustrated in FIG. 5F), or may be displayed in gray (illustrated in FIG. 5G). Alternatively, an arrow mark indicating that the allocated item is returned to the original setting item may be displayed when the switching flag is turned on.

Furthermore, the embodiments and the modified example described above illustrate an example in which the up-cross key 74a is used as an operation member for changing the allocated item and the electronic dial 75 is used as an operation member for changing the setting value for the allocated item. However, operation members other than the operation members described above may also be used. For example, keys other than the cross key 74, buttons to which other functions are not allocated on the image capturing standby screen, or an operation for touching a predetermined area on the touch panel 70a, may also be used as the operation member for changing the allocated item. As the operation member for changing the setting value for the allocated item, not only a dial, but also an operation of pressing a button, an operation of touching a position indicating the setting value on the touch panel, a touch-move operation, or both of the touch-move operation and a dial operation, may be used to change the setting value. When the switching flag illustrated in FIG. 4A is turned on, an operation member located near the operation member for changing the allocated item may be used to change setting value for the allocated item. For example, when the allocated item is changed using the up-cross key 74a, the controller wheel 73 which is located around the cross key 74 may be used as the operation member for changing the setting value for the allocated item. This configuration allows the user to change the setting value by slightly moving the position of a user's finger after changing the allocated item. When the switching flag illustrated in FIG. 4B is turned on, the operation member for changing the setting value for the allocated item and the operation member for changing the allocated item may be located at positions where the respective members are operated by a user's different fingers. For example, when the allocated item is changed by the up-cross key 74a which is located at the right side as viewed from the back surface (side where the display surface of the display unit 28 is located) of the digital camera 100, the setting value may be changed by an operation member located at the left side, or an operation member located in the vicinity of a lens.

As the allocated item, International Organization for Standardization (ISO) sensitivity, white balance (WB), and the like may be provided in addition to the items described above. The aperture value, for example, may be selected as the initial item in the Av mode, and the shutter speed may be selected as the initial item in the Tv mode while other items can be selected from among the exposure correction, the ISO sensitivity, and the WB.

As the setting items that can be set as the allocated item, not only the setting items described above, but also a sound volume or a reproduction part in reproducing music or a moving image, as well as a color tone and brightness on an image edit screen may be set. Further, switching of a display position, or switching of a display page (image, text) may be set as the setting items in a case where a page, image, text, or the like on the Internet is displayed.

The embodiments described above illustrate a case where, in step S401, the switching flag is turned on when a certain period has elapsed after the pressing of the switching button. However, the following configuration may also be employed: if the period for pressing the switching button is less than a certain period, the switching flag may be turned on to return the allocated item to the original item when the pressing of the switching button is released, and if the period for pressing the switching button is equal to or longer than a certain time, the switching flag may be turned off. With this configuration, if the user wishes to switch semipermanently a function to be allocated to the rotary member, the function can be easily switched by pressing a switching button for a short period. If the user wishes to switch temporarily an item to be allocated to the rotary member and then return the item to the original item immediately, the switching button may be pressed for a certain period or longer. In this case, the timing for returning the item to the original item is not limited to the timing that the pressing of the switching button is released, but instead may be timing that an operation on the rotary member is performed after the switching of the allocated item is completed, or after a lapse of a predetermined period such as two seconds after an operation on the rotary member is completed.

Various control operations performed by the system control unit 50 as described above may be implemented by one piece of hardware, or a plurality of pieces of hardware may share the processing to perform the overall control operation of the apparatus.

The present disclosure has been described in detail above based on embodiments, but the present disclosure is not limited to these specific embodiments. The present disclosure also encompasses various embodiments without departing from the scope of the disclosure. In addition, the embodiments described above are merely example embodiments of the present disclosure, and the embodiments can be combined as needed.

The embodiments described above illustrate a case where the present disclosure is applied to the digital camera 100. However, the present disclosure is not limited to these examples, but can be applied to any electronic device as long as the electronic device can switch a setting item for which a setting value is changed by a predetermined operation. Specifically, the present disclosure can be applied to a mobile phone terminal, a mobile image viewer, a digital photo frame, a music player, a game console, an electronic book reader, household appliances, a PC, a projection apparatus, a tablet, and the like.

Other Embodiments

The present disclosure can also be implemented by executing the following processing: software (program) for implementing the functions according to the embodiments described above is supplied to a system or apparatus via a network or various types of recording media, and a computer (or a central processing unit (CPU), a micro processing unit (MPU), etc.) of the system or apparatus reads out program code and executes the program code. In this case, the program and recording media storing the program constitute the present disclosure.

According to the present disclosure, it is possible to refine the operability when a setting item for which a setting value is changed is switched by a predetermined operation.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that aspects are not limited to the disclosed embodiments. The scope of the following claims is to be accorded the broadest interpretation so as to encompass all such modifications and equivalent structures and functions.

This application claims the benefit of Japanese Patent Application No. 2017-051820, filed Mar. 16, 2017, which is hereby incorporated by reference herein in its entirety.

What is claimed is:

1. An electronic device comprising:
a first operation member;
a second operation member; and
a memory and at least one processor configured to function as:
a control unit configured to perform control,
wherein, in a case where an item allocated as a setting item for which a setting value is changed according to an operation on the first operation member is a first item, the control unit performs control to change the setting value for the first item according to the operation on the first operation member, and
wherein, after a predetermined operation of either one of releasing an operation on the second operation member, and performing a particular operation on an operation member which is different from the second operation member to be performed after releasing the operation on the second operation member, the control unit performs control in such a manner that an item, for which the setting value is changed according to the operation on the first operation member, becomes different depending on whether the operation on the second operation member is continuously performed for a first period or longer after the operation is performed on the second operation member when the first item is set as the allocated item, until the operation on the second operation member is released.

2. The electronic device according to claim 1,
wherein, after the predetermined operation and in a case where the operation on the second operation member is continuously performed for the first period or longer after the operation is performed on the second operation member when the first item is set as the allocated item, until the operation on the second operation member is released, the control unit performs control to change the setting value for the first item according to the operation on the first operation member, and
wherein, after the predetermined operation and in a case where the operation on the second operation member is not continuously performed for the first period or longer after the operation is performed on the second operation member when the first item is set as the allocated item, until the operation on the second operation member is released, the control unit performs control to change the setting value for the second item according to the operation on the first operation member.

3. The electronic device according to claim 1,
wherein, after the predetermined operation and in a case where the operation on the second operation member is not continuously performed for the first period or longer after the operation is performed on the second operation member when the first item is set as the allocated item, until the operation on the second operation member is released, the control unit performs control to change the setting value for the first item according to the operation on the first operation member, and
wherein, after the predetermined operation and in a case where the operation on the second operation member is continuously performed for the first period or longer after the operation is performed on the second operation member when the first item is set as the allocated item, until the operation on the second operation member is released, the control unit performs control to change the setting value for the second item according to the operation on the first operation member.

4. The electronic device according to claim 3, wherein, after a predetermined operation of either one of releasing the operation on the second operation member and performing the particular operation to be performed after releasing the operation on the second operation member, the control unit performs control to change the setting value for the first item according to the operation on the first operation member according to the operation on the first operation member after the operation is performed on the second operation member and before the operation on the second operation member is released.

5. The electronic device according to claim 1, wherein the predetermined operation is an operation for releasing the operation on the second operation member and is not the particular operation.

6. The electronic device according to claim 1, wherein the predetermined operation is the particular operation and is not an operation for releasing the operation on the second operation member, and the particular operation is an operation for giving an image capture instruction after the operation on the second operation member is released.

7. The electronic device according to claim 1, wherein the predetermined operation is the particular operation and is not an operation for releasing the operation on the second operation member, and the particular operation is an operation to be performed on the first operation member after the operation on the second operation member is released.

8. The electronic device according to claim 1, wherein, in a case where the operation on the second operation member is not continuously performed for the first period or more after the operation is performed on the second operation member when the first item is set as the allocated item, until the operation on the second operation member is released, the control unit performs control to change the setting value for the first item according to the operation on the first operation member after the operation on the second operation member is released until a second period elapses and, after the second period has elapsed after the operation on the second operation member is released, the control unit performs control to change the setting value for the second item according to the operation on the first operation member.

9. The electronic device according to claim 1,
wherein the second operation member is a button,
wherein the operation on the second operation member is a predetermined touch operation on a touch panel,
wherein the first operation member is a rotatable operation member,
wherein the operation on the first operation member is a movement of a touch position on a touch panel, and
wherein the control unit controls a display unit to display which one of a plurality of items corresponds to the allocated item.

10. The electronic device according to claim 1, further wherein the memory and at least one processor further are configured to function as a selection unit configured to select either one of a plurality of modes including a first mode and a second mode,
wherein the allocated item in the first mode is different from the allocated item in the second mode.

11. The electronic device according to claim 10, wherein, in a case where the selected mode is an aperture priority mode, the first item indicates an aperture value and the second item indicates one of exposure correction, International Organization for Standardization (ISO) sensitivity, and white balance.

12. The electronic device according to claim 10, wherein, in a case where the selected mode is a shutter priority mode, the first item indicates a shutter speed and the second item indicates either one of exposure correction, International Organization for Standardization (ISO) sensitivity, and white balance.

13. The electronic device according to claim 1, wherein, after the operation is performed on the second operation member when the first item is set as the allocated item, and before the operation on the second operation member is released, the control unit performs control to change the setting value for the second item according to the operation on the first operation member.

14. An electronic device comprising:
a memory and at least one processor configured to function as:
an acceptance unit configured to accept an operation for switching from a first item to a second item as an allocated item for which a setting value is changed according to a first operation, and
a control unit configured to perform control,
wherein, in a case where the first item is set as the allocated item, the control unit performs control to switch the allocated item to the second item when the acceptance unit accepts the operation for switching from the first item to the second item, and wherein, according to releasing of the switching operation or a particular operation which is different from an operation on the acceptance unit to be performed after the releasing, the control unit performs control to select whether to maintain the allocated item as the second item or to switch the allocated item from the second item to the first item depending on whether (i) a period, from a time when the acceptance unit accepts the switching operation to a time when the switching operation is released, is a first period or longer, or (ii) the period, from the time when the acceptance unit accepts the switching operation to the time when the switching operation is released, is less than the first period.

15. The electronic device according to claim 14, wherein, after the acceptance of the switching operation and before the switching operation is released, the control unit performs control to change the setting value for the second item according to the first operation.

16. A control method for an electronic device having a first operation member and a second operation member, the control method comprising:

performing control, in a case where an item allocated as a setting item for which a setting value is changed according to an operation on the first operation member is a first item, to change the setting value for the first item according to the operation on the first operation member; and performing control, after a predetermined operation of either one of releasing an operation on the second operation member, and performing a particular operation on an operation member which is different from the second operation member to be performed after releasing the operation on the second operation member, in such a manner that an item, for which the setting value is changed according to the operation on the first operation member, becomes different depending on whether the operation on the second operation member is continuously performed for a first period or longer after the operation is performed on the second operation member when the first item is set as the allocated item, until the operation on the second operation member is released.

17. A control method for an electronic device, the control method comprising:

accepting an operation for switching from a first item to a second item as an allocated item for which a setting value is changed according to a first operation;

performing control, in a case where the first item is set as the allocated item, to switch the allocated item to the second item when accepting includes accepting the operation for switching from the first item to the second item; and performing control, according to releasing of the switching operation or a particular operation which is different from an operation to be performed after the releasing, to select whether to maintain the allocated item as the second item or to switch the allocated item from the second item to the first item depending on whether (i) a period, from a time when accepting includes accepting the switching operation to a time when the switching operation is released, is a first period or longer, or (ii) the period, from the time when accepting includes accepting the switching operation to the time when the switching operation is released, is less than the first period.

18. A non-transitory computer-readable storage medium storing a program causing an electronic device to perform the control method according to claim 16.

19. A non-transitory computer-readable storage medium storing a program causing an electronic device to perform the control method according to claim 17.

* * * * *